Dec. 22, 1964   J. AMATO   3,162,147
MACARONI RADIAL FEED MACHINE
Filed Sept. 23, 1960   2 Sheets-Sheet 1
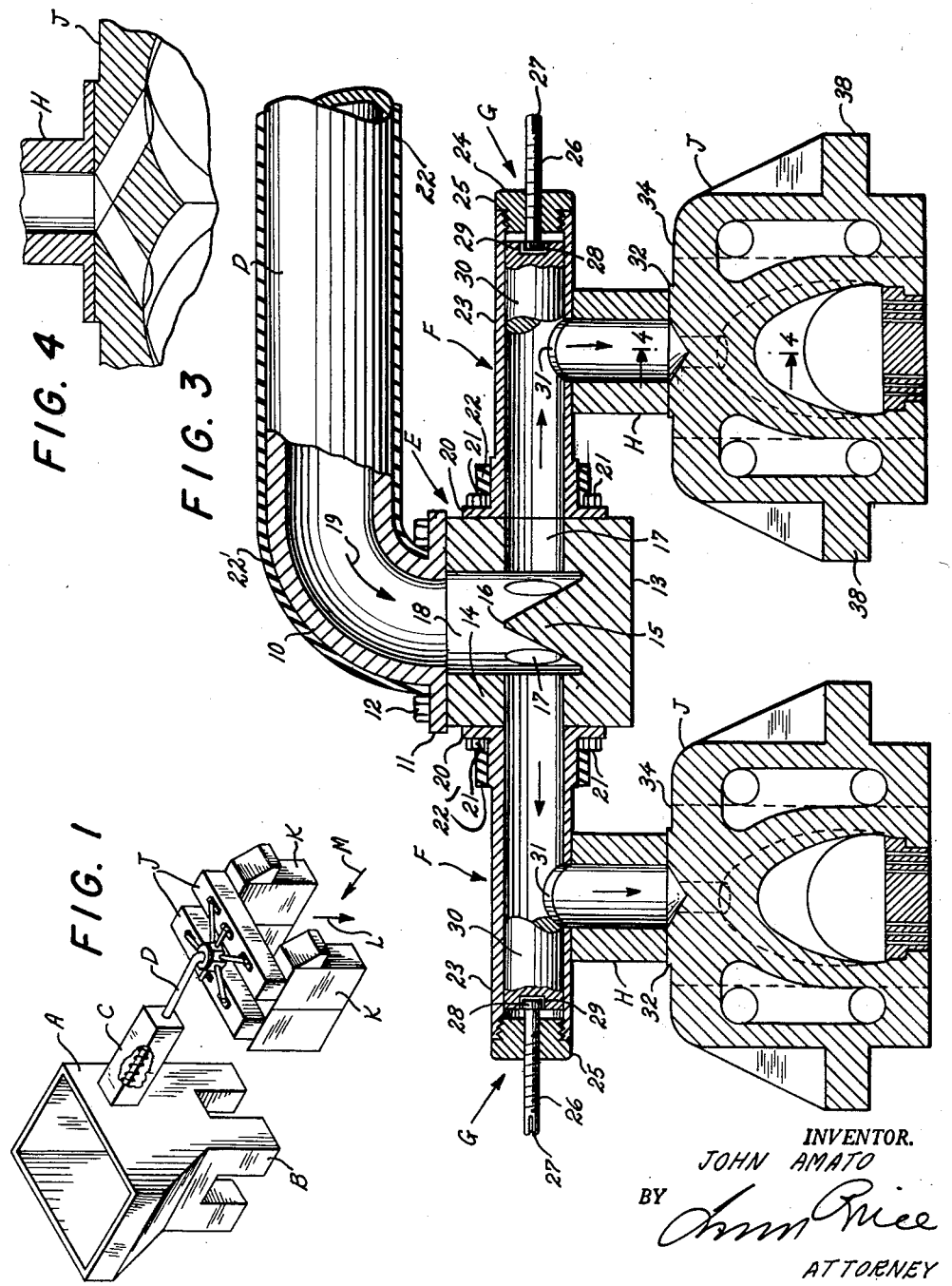
INVENTOR.
JOHN AMATO
BY
ATTORNEY

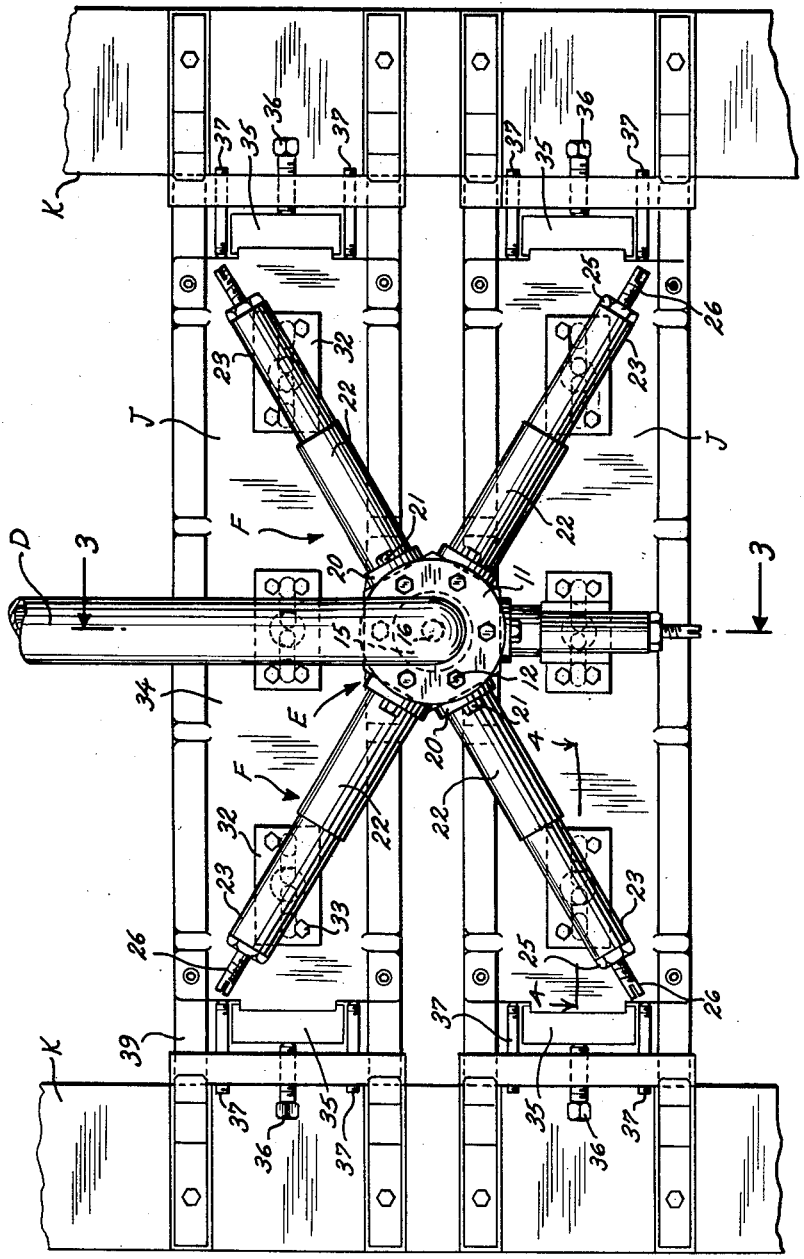

3,162,147
MACARONI RADIAL FEED MACHINE
John Amato, Brooklyn, N.Y., assignor to Clermont Machine Company, Inc., Brooklyn, N.Y., a corporation of New York
Filed Sept. 23, 1960, Ser. No. 58,094
13 Claims. (Cl. 107—14)

The present invention relates to a radial feed for a macaroni machine in which the paste material will be fed to extruders from which it is processed as macaroni or spaghetti.

Although not limited thereto, the present invention will be particularly described in combination with a macaroni machine in which the dough or paste is extruded through a series of dies to form elongated strings of spaghetti or macaroni, following which the strings or length of spaghetti or macaroni are cut off, placed upon sticks or rods, carried through suitable drying apparatus, and finally removed from the sticks and cut to lengths and packaged.

In the feeding of paste or dough materials for making extruded spaghetti or macaroni, considerable difficulty has been experienced in feeding the material uniformly to the dies, through which the spaghetti or macaroni is expressed, and it has been found necessary to carefully regulate the condition or quality of the dough or paste, and to convey it to the dies so that the dough is in substantially uniform condition when it enters the dies, and is extruded therefrom.

Considerable difficulties have been encountered in radiating systems where a series of elongated separating pipes convey the dough in fluid condition to the separated or elongated dies, because of the tendency of the dough or paste to change in consistency, dryness and kneadability.

These changes are particularly apparent where some of the dough is caused to pass through a long conduit as compared to other dough which passes through a shorter conduit.

It is among the objects of the present invention to provide a distribution system particularly adapted to but not limited to macaroni extrusion heads which will assure a uniform distribution of macaroni dough to dies without variation in the condition of the dough as it approaches or is extruded through the dies.

Another object is to provide a distribution head for a macaroni machine, and particularly for a vacuumized macaroni screw press which will give a higher and better quality extruded material and which will give a more uniform quality of macaroni or spaghetti as the case may be. The vacuum is centrally applied to the dough mass to remove gases and air therefrom.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects, it has been found most satisfactory according to a preferred embodiment of the present invention, particularly where elongated die elements are employed to provide a radiating head which is positioned between the elongated die heads so that the dough will be fed thereto to a radiating system with a minimum variation in the quality, dryness or kneadability thereof as it approaches the die heads.

In the preferred arrangement, the hopper receiving the dough is connected by an extrusion press member or a screw press through a relatively large conduit leading to a central radial head.

The extrusion dies are elongated so that there are provided two rows of extruded spaghetti or macaroni extending transversely to the direction of the movement but parallel to each other.

This will form two rows of macaroni or spaghetti readily picked up by sticks, carried on a conveyor, so that the macaroni or long goods may be carried in closely adjacent reversed U-shaped loops upon these sticks through a drying oven.

The essential feature of the present invention resides in the fact that the radial head is positioned between the elongated dies and is connected to communicate with spaced points along the dies by a series of radiating conduits.

This obviates having long conduits extending from the screw extruder to the different die elements with resultant uneven quality of the dough when it is finally presented to the dies.

With the foregoing and other objects in view, the invention consists of the novel construction, combination and arrangement of parts as hereinafter more specifically described and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

FIG. 1 is a top diagrammatic layout view of the complete machine according to the present invention.

FIG. 2 is a top plan view of the distribution head.

FIG. 3 is a transverse section on the line 3—3 of FIG. 2.

FIG. 4 is a fragmentary transverse sectional view upon the line 4—4 of FIGS. 2 and 3.

Referring to FIG. 1, there is shown a hopper A supported on the legs B to which is connected the screw extrusion unit C. The hopper A is desirably subjected to vacuum to remove gases and air from the dough so that bubbles will not form thereafter in the dough.

The main supply conduit D will carry the dough without separation to the central extrusion head E, from which the radiating conduits F with the adjustable plugs G will supply the dough through vertical conduits H to the cross die members J having a series of openings in a row or rows for the extrusion of the strings or elongated strips of spaghetti or macaroni.

These die heads in turn are supported on the members K as shown in FIG. 1, and the macaroni will be extruded downwardly as indicated by the arrow L and will be picked up by sticks moving in the direction M.

Referring particularly to FIGS. 2 and 3, the main conduit D from the screw press member will preferably have an internal cross sectional area equal to or at least half as great or at least three-quarters of the cross sectional area of the radiating conduits F, and both the conduit D as well as the conduits F may be enclosed in insulating material or jacketed so that the temperature will be maintained uniform during the flow of dough to the die heads J.

The conduit D, having the insulating covering 22', will turn to an angle of ninety degrees as indicated at 10 and will terminate in a flange 11 (see FIG. 3) which is bolted at 12 to the central hollow block member 13 forming part of the central distribution element E.

The head 13 is the important feature of the present invention, and it consists of a block member with very heavy walls 14, and a central upstanding conical nose 15.

The openings 17 at the sides of the interior chamber 18 will be partly blocked by the conical member 15 with the top 16 of the conical member 15 extending to the same level as or slightly above the openings into the spider or radial members F.

The dough will be forced as indicated by the arrow 19 as shown in FIG. 3, into the chamber 18 with the conical member 15. This will cause it to spread to the outside of the chamber 18 and then to pass into the openings 17, and will assure a more uniform distribution and will cause a compression of the dough in the chamber 18 before it flows to the die cross heads J.

This will make the dough more plastic and assure more uniform flow as it passes through the openings 17. The dough material when forced between convergent surfaces becomes more compressed and increases in fluidity so that it will flow readily into and through the conduits F, when the pressure is released after it leaves the die heads J the dough material tends to solidify. The entire dough material when flowing in direction 19 should be thus rendered more fluid as it is passing beyond the insulating material 22 and 22' on the conduits D and F and when it will become subject to cooling as it passes to and through the die heads and it should evenly equalize itself through the spider conduits even though they have varying lengths.

Each of the openings 17 through the sides of the member 13 will be connected to the spider elements F.

These spider elements F have the connecting flanges 20 mounted by the bolts 21 upon the sides of the unit 13.

The spider conduits F are each desirably provided with a heavy insulating or jacket portion 22 which may be an insulating material or consist of a liquid jacket, and they terminate in the relatively thin walled sections 23 which are desirably of the same length.

The thin terminal portions 23 in which the greatest radiation of heat will take place resulting in a slight hardening of the dough but not decreasing its flow capacity are all of about the same length in each of the six radiating branches.

Each of these conduits 23 is closed by means of a screw plug 24 having the hexagon head 25.

Each of the plugs 24 carries a screw adjuster 26 having a fillister slot 27.

The inside ends of the screws 26 have the heads 28 which fit into the recesses 29 in the plugs 30.

The plugs 30 are adjustable in the conduits 23 so as to regulate the cross section of the flow passage through the opening 31 in the conduits 23 and regulate the amount of dough which will pass from the conduits 23 into the conduits H.

The vertical tubular members forming the connection H have very heavy walls, and their lower ends are mounted by means of the plates 32 and the bolts 33 upon the top face 34 of the transverse die heads J.

These transverse die heads J are held in position by means of the end plugs 35 and bolts 36.

The adjustable stop members 37 fix the position of the die J between the support structures K.

The flanges 38 fit upon the cross members 39 extending between the side supports K.

The provision of a radial head or member 13 with a central cylindrical chamber 18 and a nose 15 forcing the dough outwardly into the spider members 23 is the important feature of the present invention and resides in uniform dough materials being distributed along the length of the die members J and to the dies.

As many changes could be made in the above macaroni radial feed machine, and many widely different embodiments of this invention could be made without departing from the scope of the claims, it is intended that all matter contained in the above description shall be interpreted as illustrative and not in a limiting sense.

Having now particularly described and ascertained the nature of the invention, and in what manner the same is to be performed, what is claimed is:

1. In a macaroni extrusion machine of the type having two spaced transverse elongated dies for producing rows of elongated strips of extruded macaroni, a dough feed hopper, a screw extruder receiving dough from the hopper, a single outlet conduit receiving dough from the screw extruder; the combination therewith of a radial spider distribution unit positioned between the elongated dies and receiving dough from said outlet conduit and feeding it to said elongated dies along the length thereof, said spider having a hollow head, said head having a single entrance at one side and a plurality of outlets around an adjacent side and having compression means to cause said dough to become compressed as it passes from the entrance to the outlets, and radiating outlet conduits, said hollow head being positioned above and midway of the length of said dies and said single conduit opening into the top of the hollow head, and said radiating outlet conduits consisting of tubes having the same internal diameter throughout and being three in number for each die and having a central outlet to the center of the top of the die and terminal outlets to the top of the ends of the die and having cooling sections of the same length along each conduit adjacent the outlets to the die.

2. In a macaroni extrusion machine of the type having two spaced transverse elongated dies for producing rows of elongated strips of extruded macaroni, a dough feed hopper, a screw extruder receiving dough from the hopper, a single outlet conduit receiving dough from the screw extruder; the combination therewith of a radial spider distribution unit positioned between the elongated dies and receiving dough from said outlet conduit and feeding it to said elongated dies along the length thereof, said spider having a hollow head, said head having a single entrance at one side and a plurality of outlets around an adjacent side and having compression means to cause said dough to become compressed as it passes from the entrance to the outlets, and radiating outlet conduits, said hollow head having a central vertical compartment with openings in the side wall thereof to said radiating conduits and said compression means including a central upwardly projecting conical nose partly blocking the inlets to said radiating conduits, said hollow head being positioned above and midway of the length of said dies and said single conduit opening into the top of the hollow head, and said radiating outlet conduits consisting of tubes having the same internal diameter throughout and being three in number for each die and having a central outlet to the center of the top of the die and terminal outlets to the top of the ends of the die and having cooling sections of the same length along each conduit adjacent the outlets to the die.

3. In a macaroni extrusion machine of the type having two spaced transverse elongated dies for producing rows of elongated strips of extruded macaroni, a dough feed hopper, a screw extruder receiving dough from the hopper, a single outlet conduit receiving dough from the screw extruder; the combination therewith of a radial spider distribution unit positioned between the elongated dies and receiving dough from said outlet conduit and feeding it to said elongated dies along the length thereof, said spider having a hollow head, said head having a single entrance at one side and a plurality of outlets around an adjacent side and having compression means to cause said dough to become compressed as it passes from the entrance to the outlets, and radiating outlet conduits, said radiating conduits at their ends have a vertical connection to the dies along the length thereof and adjustable plug members to regulate the amount of dough being fed into said vertical connections, said hollow head being positioned above and midway of the length of said dies and said single conduit opening into the top of the hollow head, and said radiating outlet conduits consisting of tubes having the same internal diameter throughout and being three in number for each die and having a central outlet to the center of the top of the die and terminal outlets to the top of the ends of the die and having cooling sections of the same length along each conduit adjacent the outlets to the die.

4. In a macaroni extrusion machine of the type having two spaced transverse elongated dies for producing rows of elongated strips of extruded macaroni, a dough feed hopper, a screw extruder receiving dough from the hopper, a single outlet conduit receiving dough from the screw extruder; the combination therewith of a radial spider distribution unit positioned between the elongated dies and receiving dough from said outlet conduit and feeding it to said elongated dies along the length thereof, said spider having a hollow head, said head having a single entrance at one side and a plurality of outlets around an adjacent side and having compression means to cause said dough to become compressed as it passes from the entrance to the outlets, and radiating outlet conduits, said radiating outlet conduits having insulated portions, said hollow head being positioned above and midway of the length of said dies and said single conduit opening into the top of the hollow head, and said radiating outlet conduits consisting of tubes having the same internal diameter throughout and being three in number for each die and having a central outlet to the center of the top of the die and terminal outlets to the top of the ends of the die and having cooling sections of the same length along each conduit adjacent the outlets to the die.

5. In a distribution head for a spaghetti and macaroni extruding system having a plurality of parallel spaced elongated extrusion heads to assure uniform distribution of dough to dies without substantial variation in the condition of the dough as it approaches and is extruded through the dies of the type having a macaroni screw press, said distribution head comprising spaced elongated separated die heads having elongated cavities and lower elongated spaced die extrusion elements to extrude parallelly elongated spaced groups of spaghetti strings, a central radial header positioned centrally above and between said die heads, a large conduit leading into the top of said header and smaller radiating conduits leading from the sides of the header to the ends and the middle of each die head so that the dough will be fed simultaneously into the center and the ends of the die head, said radiating conduits constituting a spider having central inlets and outlets to the die heads at the ends thereof and having their central portions insulated and their outer portions devoid of insulation so that the dough will be slightly chilled while passing therethrough and said portions devoid of insulation being all of the same length so that the dough will cool equally in passing therethrough, said insulation being located beyond the screw press in the direction of flow and terminating substantially before the die heads in the direction of flow.

6. The head of claim 5, said large conduit having an internal cross sectional area between one half and three-quarters of the cross sectional area of the radiating conduits.

7. The head of claim 5, the large conduit also being insulated to maintain uniform flow temperatures.

8. The head of claim 5, said central header being a cylinder and having a central cylindrical recess having about the same cross sectional area as the large conduit and having an upwardly extending conical projection and the outlets to the radial conduits being equally spaced around the recess at about the upper part of said conical projection.

9. The head of claim 5, the flow passageways from the outlet ends of the radiating conduits to the ends and middle of the die heads being provided with screw adjustment movable plugs to regulate the flow area therethrough.

10. A method of distributing and extruding spaghetti and macaroni paste which comprises exerting a mechanical pressure upon while subjecting a central mass of paste to said pressure, compressing the paste by forcing it through an angular passageway of decreasing width and then causing it to flow through passageways of unequal length but of uniform cross sectional area and maintaining its temperature uniform in the early part of said last-named passageways and then chilling the paste in the latter part of said passageways by cooling the paste for an equal distance therealong and at an equal rate and then feeding it to an extrusion position so that it will be extruded in the same direction as it is fed, said passageways radiating from the angular passageway and each of said passageways having their chilling latter parts of the same extent so they will conduct the dough while being chilled for the same distance even though the outlets of said passageways are of varying distance from the angular passageway.

11. The method of claim 10 in which the temperature is maintained during the passage of the dough from the central mass to and through the angular passageways and during the initial portions of the passageways of unequal length while the latter part of the passageways of unequal length will all be uninsulated for an equal distance so that a uniform chilling and cooling will take place therethrough.

12. The head of claim 5, said die heads and screw press being uninsulated and the insulation being limited to the large conduit between the screw press and radial header and to the initial portion of the smaller conduits beyond said header and terminating substantially before the die heads.

13. The distribution head of claim 5, said large conduit being insulated for substantially its entire length and said smaller conduits being insulated only for their intital lengths so that their terminal lengths will all be approximately the same to give equal cooling and chilling of the dough passing therethrough.

References Cited in the file of this patent

UNITED STATES PATENTS

| | | |
|---|---|---|
| 1,744,591 | Taurel | Jan. 21, 1930 |
| 2,197,988 | Tanzi | Apr. 23, 1940 |
| 2,215,149 | Giezendanner | Sept. 17, 1940 |
| 2,217,627 | Tanzi | Oct. 8, 1940 |
| 2,257,695 | Libotzky | Sept. 20, 1941 |
| 2,298,644 | Hummel | Oct. 13, 1942 |
| 2,308,552 | Spinozzi | Jan. 19, 1943 |
| 2,437,460 | De Francisci | Mar. 9, 1948 |
| 2,481,274 | Ambrette | Sept. 6, 1949 |
| 2,775,214 | Lenner | Dec. 25, 1956 |
| 2,905,109 | Schrenk | Sept. 22, 1959 |